US008996627B1

(12) United States Patent
Urano et al.

(10) Patent No.: US 8,996,627 B1
(45) Date of Patent: Mar. 31, 2015

(54) EXTENSION SYSTEM FOR RENDERING CUSTOM POSTS IN THE ACTIVITY STREAM

(75) Inventors: Ryo Misha Urano, Sunnyvale, CA (US); Irene Chung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 13/197,002

(22) Filed: Aug. 3, 2011

Related U.S. Application Data (60) Provisional application No. 61/501,725, filed on Jun. 27, 2011.

(51) Int. Cl.
*G06F 15/16* (2006.01)
*G06F 12/06* (2006.01)

(52) U.S. Cl.
CPC ................................. *G06F 12/0646* (2013.01)
USPC ........... 709/206; 709/204; 709/205; 709/207; 709/227; 370/241

(58) Field of Classification Search
USPC ............................ 709/204–207, 227; 370/241
See application file for complete search history.

(56) References Cited

U.S. PATENT DOCUMENTS

| | | | |
|---|---|---|---|
| 7,321,883 B1 * | 1/2008 | Freedy et al. .................... 706/45 |
| 7,366,990 B2 | 4/2008 | Pitroda | |
| 7,721,303 B2 * | 5/2010 | Alves de Moura et al. ... 719/328 |
| 2002/0143874 A1 * | 10/2002 | Marquette et al. ............ 709/204 |
| 2003/0050977 A1 * | 3/2003 | Puthenkulam et al. ....... 709/204 |
| 2003/0226013 A1 * | 12/2003 | Dutertre ........................ 713/163 |
| 2005/0198299 A1 * | 9/2005 | Beck et al. .................... 709/226 |
| 2006/0026288 A1 * | 2/2006 | Acharya et al. ............... 709/227 |
| 2007/0019556 A1 * | 1/2007 | Cordsmeyer et al. ......... 370/241 |
| 2007/0036143 A1 * | 2/2007 | Alt et al. ........................ 370/352 |
| 2008/0010343 A1 * | 1/2008 | Escaffi et al. .................. 709/204 |
| 2009/0013043 A1 * | 1/2009 | Tan ................................ 709/205 |
| 2009/0124349 A1 * | 5/2009 | Dawson et al. ................. 463/24 |
| 2009/0154362 A1 * | 6/2009 | Chao et al. .................... 370/241 |
| 2009/0197580 A1 * | 8/2009 | Gupta et al. ............... 455/414.2 |
| 2010/0306249 A1 * | 12/2010 | Hill et al. ...................... 707/769 |
| 2011/0161085 A1 * | 6/2011 | Boda et al. .................... 704/260 |

(Continued)

OTHER PUBLICATIONS

Wenger et al., "Technology for Communities," CEFRIO Book Chapter v 5.2, Jan. 18, 2005, pp. 1-15.

(Continued)

*Primary Examiner* — Razu Miah
(74) *Attorney, Agent, or Firm* — Patent Law Works LLP (57) ABSTRACT

An extension system for rendering custom posts in the activity stream comprises an activity streams front end, an activity streams backend and a custom template storage. The activity streams backend is communicatively coupled to receive activity information from activity sources. Clients send custom metadata to the activity streams backend, including a key for decoding and rendering the proper templates and associated scripts on the activity streams frontend. The activity streams backend encodes this custom key and metadata as part of the activity information. The activity streams front end retrieves the encoded information and decodes the encoded information to produce data and a type. From the type, the activity streams front end accesses the custom template storage to determine the associated custom template and JavaScript. The activity streams front end cooperates with the client to use the data, custom template and JavaScript to render the activity information at the client device.

23 Claims, 6 Drawing Sheets

(56) References Cited

U.S. PATENT DOCUMENTS

| | | | |
|---|---|---|---|
| 2011/0208822 A1* | 8/2011 | Rathod | 709/206 |
| 2011/0276396 A1* | 11/2011 | Rathod | 705/14.49 |
| 2011/0289132 A1* | 11/2011 | Polis et al. | 709/201 |
| 2011/0302153 A1* | 12/2011 | Meretakis et al. | 707/722 |
| 2012/0092439 A1* | 4/2012 | Mackie et al. | 348/14.06 |

OTHER PUBLICATIONS

Adamic et al., "A Social Network Caught in the Web," Internet Journal, First Monday, Jun. 2, 2003, pp. 1-22, vol. 8, No. 6.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Hammond et al., "Social Bookmarking Tools (I)," D-Lib Magazine, Apr. 2005, vol. II, No. 4, ISSN 1082-9873, 23 pgs.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

* cited by examiner

EXTENSION SYSTEM FOR RENDERING CUSTOM POSTS IN THE ACTIVITY STREAM

CROSS REFERENCE TO RELATED APPLICATIONS

This application claims the benefit under 35 U.S.C. §119(e) of U.S. Provisional Application No. 61/501,725, entitled "EXTENSION SYSTEM FOR RENDERING CUSTOM POSTS IN THE ACTIVITY STREAM" filed on Jun. 27, 2011, the entire contents of which are incorporated herein by reference.

BACKGROUND

The present disclosure relates to electronic communication and the delivery of activity streams. In particular, the present disclosure relates to an extension system for rendering custom posts in the activity stream.

The popularity and use of the Internet, web browsers, social networks and other types of electronic communication has grown dramatically in recent years. While users once operated their computing devices with a single browser showing a single webpage, new methods for delivering information such as activity on social networks have been developed. For example, new user interfaces in social networking and messaging tools provide new user interfaces for delivering an activity stream of information. From this activity stream user interface, users can share links, photos, videos, status messages and comments organized in "conversations" and visible in the user's inbox.

Current systems and methods for providing these user activities have been limited to utilizing a predefined and fixed format for sending activity information from the activity sources and presenting the activity information at the client device. Attempts to customize presentation of the activity and possible actions related to the activity are difficult and must be done manually. This is not a trivial process and requires changes to the presentation template, the data format, and the JavaScript classes. Furthermore, there are new actions that can be taken in response to different activities (e.g., posts) that are satisfied by current methods for processing activities.

SUMMARY

The present disclosure overcomes the deficiencies and limitations of the prior art at least in part by providing an extension system for rendering custom posts in the activity stream and associated methods. The extension system comprises an activity streams front end, an activity streams back-end and a custom template storage. The activity streams backend is communicatively coupled to receive activity information from activity sources. The activity streams backend receives the activity information, determines or receives a data type for the activity information and encodes the data type and activity information. In one embodiment, the encoded information is stored for use by the activity streams front end. The activity streams front end retrieves the encoded information and decodes the encoded information to produce data and a type. From the type, the activity streams front end accesses the custom template storage to determine the associated custom template and JavaScript. The activity streams front end cooperates with the client to use the data, custom template and JavaScript to render the activity information at the client device. The present disclosure also includes a method for storing and rendering custom posts in the activity stream.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

An extension system for rendering custom posts in the activity stream and associated methods are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any devices providing services. Moreover, the present invention is described below primarily in the context of a social network; however, those skilled the art will understand that the present invention applies to any type of communication and can be used to present promotions along with any type of communication.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Figure 1:
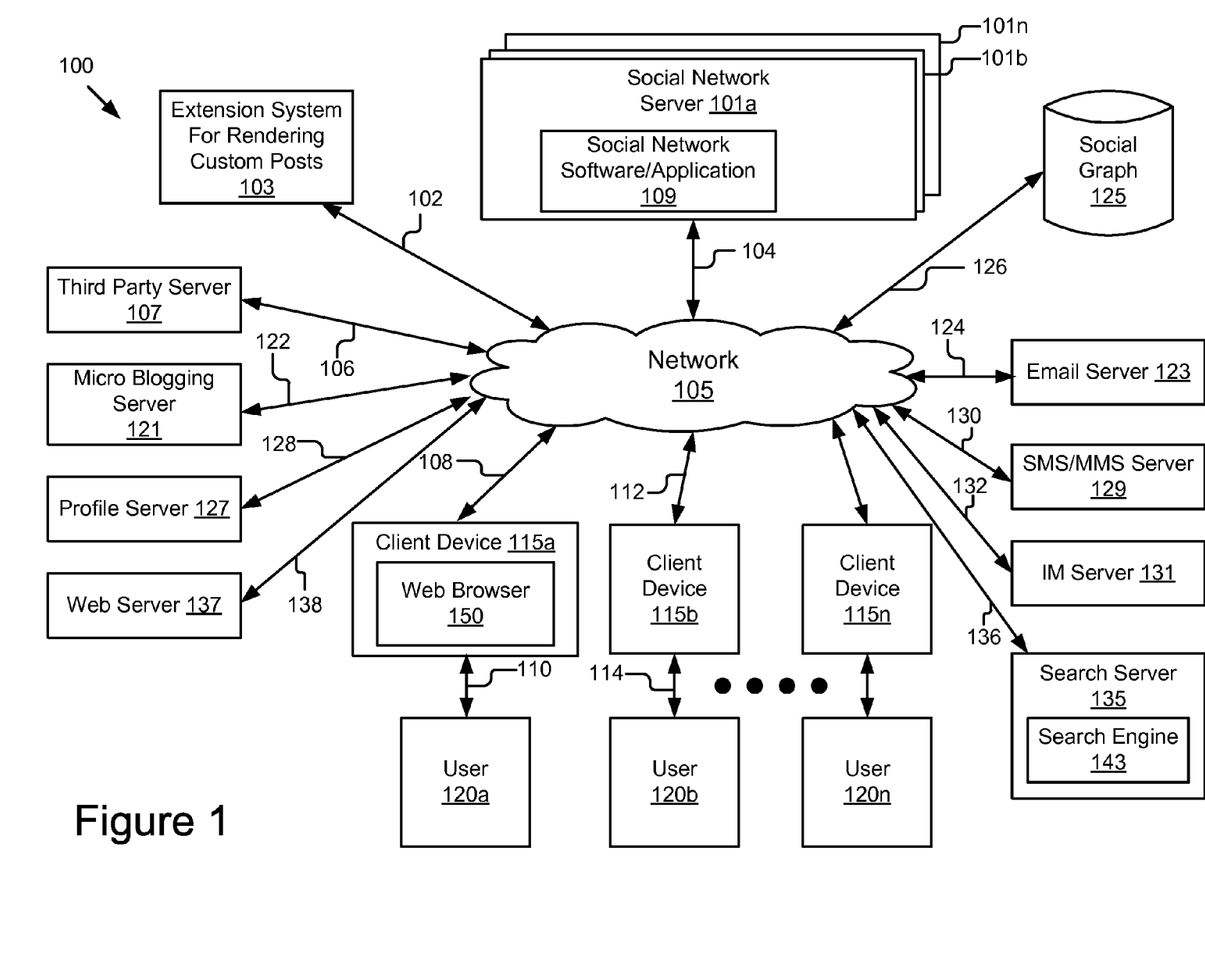
FIG. 1 is a high-level block diagram illustrating an architecture including an extension system for rendering custom posts in the activity stream according to a first embodiment of the present disclosure.

FIG. 1 illustrates a block diagram of an architecture 100 including one embodiment of an extension system 103 for rendering custom posts in the activity stream. The illustrated architecture 100 for generating and presenting custom posts includes client devices 115a, 115b, 115n that are accessed by users 120a, 120b, 120n, one or more social network servers 101a-101n and the extension system 103. In the illustrated embodiment, these entities are communicatively coupled via a network 105. Although only three client devices 115 are illustrated, persons of ordinary skill in the art will recognize that any numbers of client devices 115n are available to any number of users 120n. Moreover, those skilled in the art will recognize that while the present disclosure is described below primarily in the context of activities related to the social network 101, the present disclosure is applicable to any type of online communications.

The client devices 115a, 115b, 115n in FIG. 1 are used by way of example. While FIG. 1 illustrates three devices, the present disclosure applies to any system architecture having one or more client devices 115. Furthermore, while only one network 105 is coupled to the client devices, 115a, 115b, 115n, the social network server 101, the extension system 103 and the third party server 107, in practice any number of networks 105 can be connected to the entities. Furthermore, while only one third party server 107 is shown, the architecture 100 could include one or more third party servers 107.

In one embodiment, the social network server 101a is coupled to the network 105 via signal line 104. The social network server 101a also includes a social network software/application 109. Persons of ordinary skill in the art will recognize that though only three social network servers 101a-101n are shown any number of servers may be present. A social network is any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph 125. In some examples, the social graph 125 can reflect a mapping of these users and how they are related. Furthermore, it should be understood that social network server 101a and social network software/application 109 are representative of one social network and that there are multiple social networks 101b . . . 101n coupled to the network 105, each having its own server, application and social graph. For example, a first social network is more directed to business networking, a second more directed to or centered on academics, a third is more directed to local business, a fourth directed to dating and others of general interest or a specific focus.

While shown as stand-alone server in FIG. 1, in other embodiments all or part of the extension system 103 could be part of the third party server 107 that is connected to the network 105 via signal line 106. The extension system 103 interacts with the other servers, 101, 107, 121, 123, 127, 129, 131, 135, 137 via the network 105. The extension system 103 is also coupled for communication with the client device 115a, which is connected to the network 105 via signal line 108. The user 120a interacts with the client device 115a via signal line 110. Similarly, the client device 115b is coupled to the network 105 via signal line 112 and the user 120b interacts with the client device 115b via signal line 114. Persons of ordinary skill in the art will recognize that the extension system 103 can be stored in any combination of the devices and servers, or in only one of the devices or servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The extension system 103 interacts with other systems 107, 115a-n, 121, 123, 125, 127, 129, 131, and 135 to retrieve/receive activity information or an activity stream and generate promotional information or messages. The extension system 103 cooperates with the client device 115 to generate and present user interfaces that allow the user to view the activity stream and promotional information. In one embodiment, the extension system 103 receives activity information from the other systems 107, 121, 123, 125, 127, 129, 131 and 135. The extension system 103 processes this information to generate the activity stream. The extension system 103 interacts with the user 120 via client devices 115 to present the promotion information. In particular, the extension system 103 interacts with the web browser 150 of the client devices 115 to receive inputs and generate user interfaces as will be described in more detail below. In another embodiment, the extension system 103 also cooperates with the email server 123 to include e-mail messages in the activity stream. In another embodiment, the extension system 103 also generates activity messages and promotional messages and sends replies or commands to the related electronic communications from a Short Message Service (SMS)/Multimedia Messaging Service (MMS) server 129, an instant messaging (IM) server 131, a web server 137, and/or the third party server 107. In yet another embodiment, the extension system 103 also receives data related to electronic communication from the search server 135 that includes a search engine 143 and is coupled to the network 105 via signal line 136. In one embodiment, the search server 135 includes a search engine 143 for retrieving results that match search terms from the Internet. In one embodiment, the search engine 143 is powered by Google®. The web browser 150 and the extension system 103 are used to manage and send data to and from the third party server 107 via signal line 106, the micro-blogging server 121 via signal line 122, the profile server 127 via signal line 128, the client devices 115 via signal lines 108 and 112, the e-mail server 123 via signal line 124, the social graph 125 via signal line 126, the SMS/MMS server 129 via signal line 130, the IM server 131 via signal line 132 and the web server 137 via signal line 138.

In one embodiment, the social network server 101, the third party server 107, the micro-blogging server 121, the e-mail server 123, the profile server 127, the SMS/MMS server 129, the IM server 131, the search server 135 and web server 137 are hardware servers including a processor, memory, and network communication capabilities.

Figure 2:
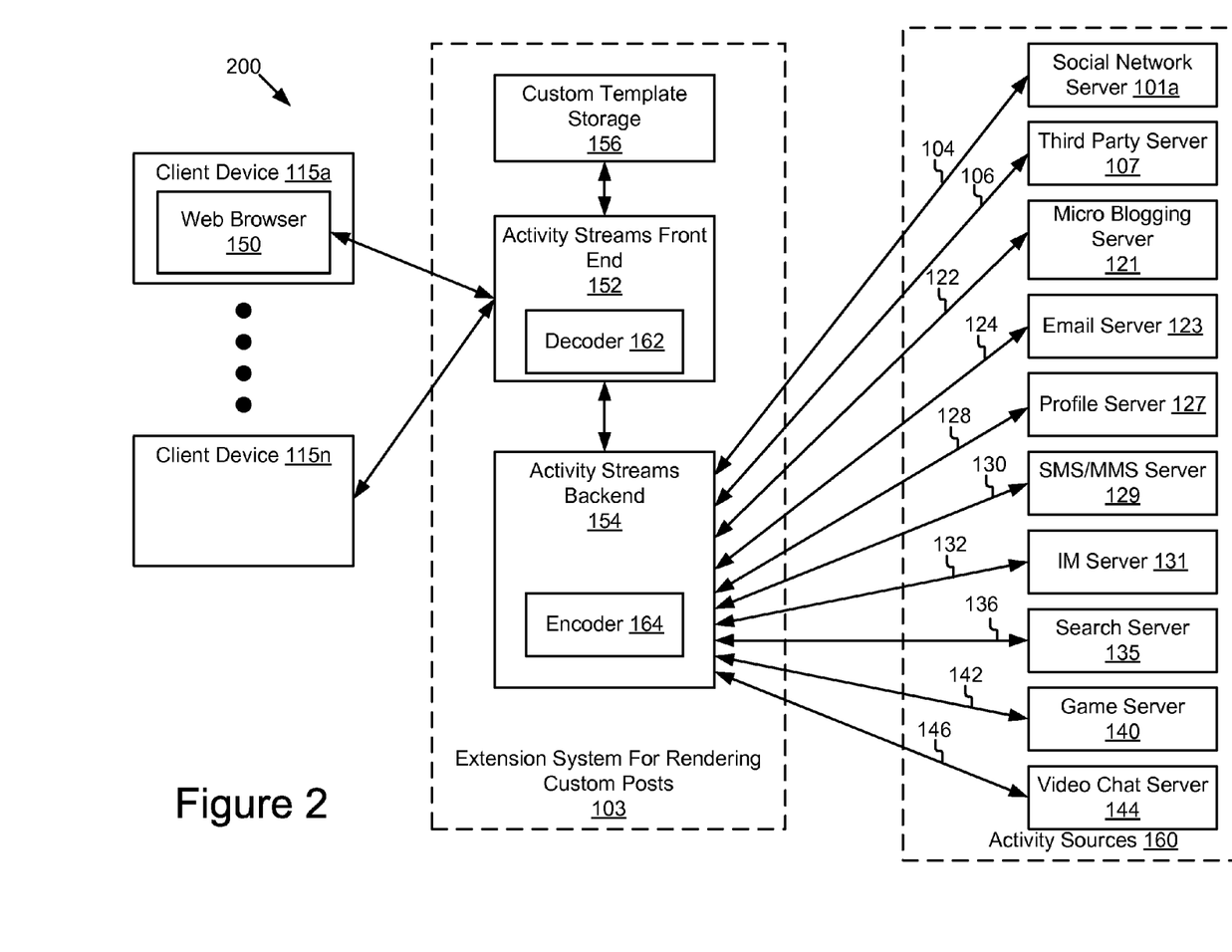
FIG. 2 is a high-level block diagram illustrating an architecture including the extension system for rendering custom posts in the activity stream according to a second embodiment of the present disclosure.

Referring now to FIG. 2, a second embodiment for the architecture 200 with the extension system 103 shown in more detail will be described. In FIG. 2, like reference numerals have been used to reference like components with the same or similar functionality that has been described above with reference to FIG. 1. Further, since those components have been described above that description will not be repeated here. As shown, the second embodiment for the architecture 200 includes a plurality of client devices 115a-115n, the extension system 103 for rendering custom posts and a plurality of activity sources 160. In one embodiment, each of the plurality of client devices 115a-115n includes the web browser 150 and is coupled for communication with the extension system 103, in particular, the activity streams front end 152. The extension system 103 and the web browsers 150 cooperate to generate and present for the user the custom posts of the present disclosure. The extension system 103 comprises an activity streams backend 154; an activity streams front end 152; and a custom template storage 156. The operation of the extension system 103 and its components will be described in more detail below. The activity streams backend 154 is coupled to the activity streams front end 152 to send activity data for the web browsers 150. The activity streams backend 154 is also coupled to the activity sources 160 to receive activity information which it sends to activity streams front end 152 which in turn translates it into the activity stream. The activity sources 160 include one or more from the group of the social network server 101, the third party server 107, the micro-blogging server 121, the e-mail server 123, the profile server 127, the SMS/MMS server 129, the IM server 131, the search server 135 and web server 137, all of which have been described above. The activity sources 160 may also include: a game server 140 for sending information related to an online game and receiving commands related to that game, and a video chat server 144 for sending information related to a video chat and receiving commands related to that video chat. The game server 140 is coupled to the activity streams backend 154 by signal line 142. The video chat server 144 is coupled to the activity streams backend 154 by signal line 146.

Extension System 103

Figure 3:
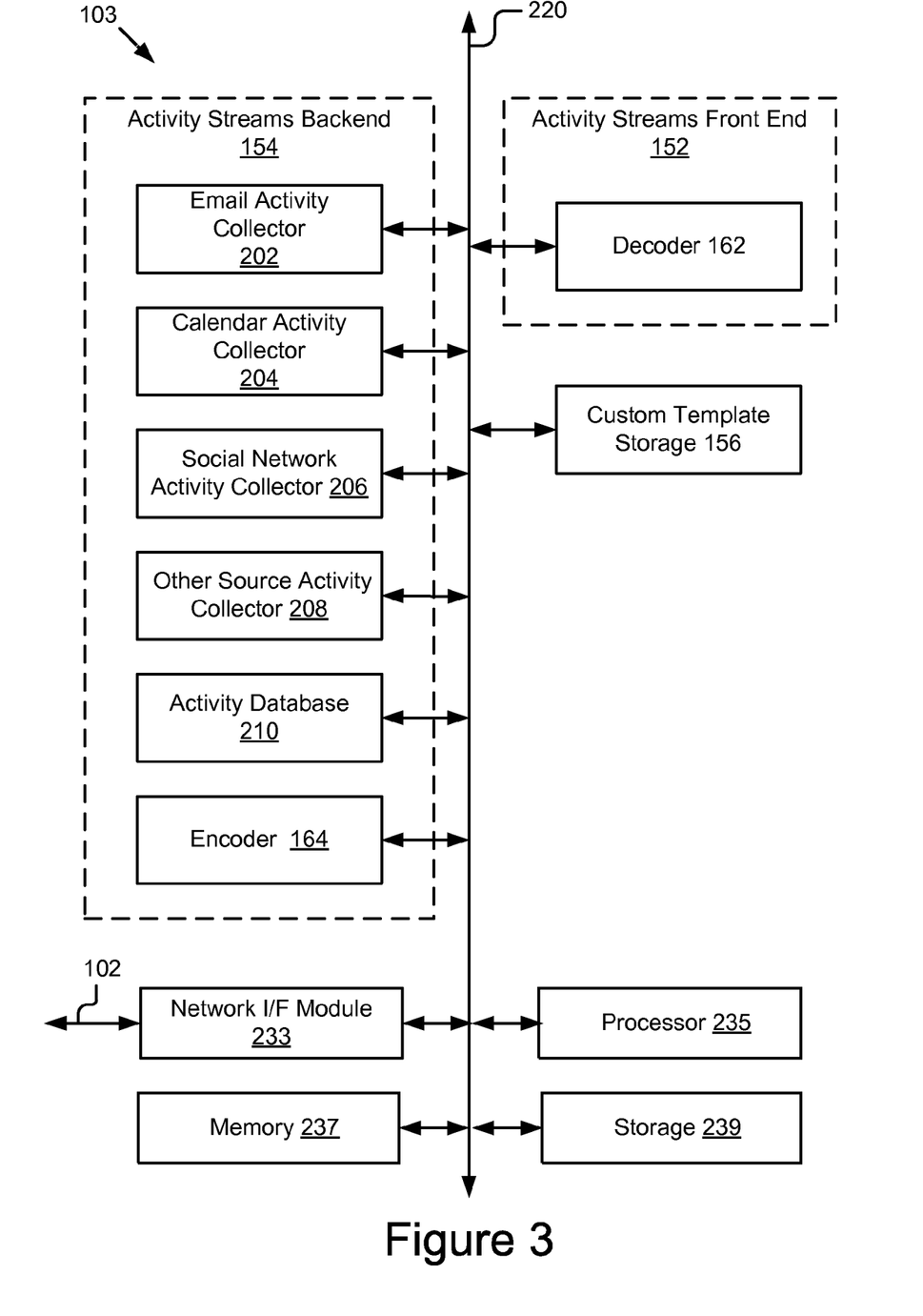
FIG. 3 is a block diagram illustrating one embodiment of the extension system for rendering custom posts in the activity stream of the present disclosure.

FIG. 3 is a block diagram of one embodiment of the extension system 103. In this embodiment, the extension system 103 comprises: a network interface module 233, a processor 235, a memory 237, storage 239, the activity streams backend 154, the activity streams front end 152, and custom template storage 156.

The network interface module 233 is coupled to network 105 by signal line 102 and to bus 220. The network interface module 233 includes ports for wired connectivity such as but not limited to USB, SD, or CAT-5, etc. The network interface module 233 links the processor 235 to the network 105 that may in turn be coupled to other processing systems. The network interface module 233 provides other conventional connections to the network 105 using standard network protocols such as TCP/IP, HTTP, HTTPS and SMTP as will be understood to those skilled in the art. In other embodiments, the network interface module 233 includes a transceiver for sending and receiving signals using Wi-Fi, Bluetooth® or cellular communications for wireless communication.

The processor 235 comprises an arithmetic logic unit, a microprocessor, a general purpose controller or some other processor array to perform computations and provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art.

In one embodiment, storage 239 stores data, information and instructions used by the extension system 103. Such stored information includes information about users, information about messages, and other information retrieved by activity streams backend 154, in particular, collector modules 202, 204, 206, 208, 210 and 212. In one embodiment, the storage 239 also stores data and other information utilized by the activity streams front end 152. In another embodiment, the custom template storage 156 is part of storage 239. Storage 239 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 239 is coupled by the bus 220 for communication with other components 152, 154, 156, 158, 233, 235 and 237 of the extension system 103.

Activity Streams Backend 154

In one embodiment, the activity streams backend 154 comprises an e-mail activity collector 202, a calendar activity collector 204, a social network activity collector 206, an other source activity collector 208, an activity database 210, and an encoder 164. These components 202, 204, 206, 208, 210 and 164 are coupled to the bus 220 for communication with each other and other components of the extension system 103. The bus 220 can be any type of conventional communication bus.

The e-mail activity collector 202 is software or routines for interacting with e-mail systems coupled to the activity streams backend 154 via the network 105. In one embodiment, the e-mail activity collector 202 interacts with the e-mail server 123 to retrieve e-mail information such as messages that have been received and sent, the status of messages as to whether they are read, unread, forwarded, replied to, etc. For example, the e-mail server 123 is an e-mail service such as Gmail offered by Google Inc. of Mountain View Calif. The e-mail activity collector 202 in one embodiment interacts with a credentials module (not shown) to retrieve the user's login name and password as well as any other information necessary to access the e-mail server 123. The e-mail activity collector 202 also stores information that has been retrieved in the activity database 210. The e-mail activity collector 202 is coupled for communication with other e-mail servers 123 and the storage 239. Those skilled in the art will recognize that even though the e-mail activity collector 202 has been described above as connecting and extracting information from a single e-mail system, the e-mail activity collector 202 may perform the same operation for a plurality of e-mail systems that are utilized by a particular user. For example, users often have several different e-mail accounts. In some embodiments, the e-mail activity collector 202 connects and collects information from two or more of these several different e-mail accounts. The e-mail activity collector 202 also interacts with the e-mail server 123 to take action with regard to e-mails that have been received for the user. For example, if a user is notified of an unread e-mail, and then reviews the e-mail; the user may respond forward or take some other action with regard to the e-mail in the user interface. This action is transmitted from the web browser 150 to the activity streams front end 152 then to the e-mail activity collector 202 to deliver to the e-mail server 123.

The calendar activity collector 204 is software or routines for interacting with the profile server 127 coupled to the activity streams backend 154 via the network 105. In one embodiment, the calendar activity collector 204 interacts with the profile server 127 to retrieve profile information such as calendar events. In one embodiment, the profile server 127 is a free time management web application such as Google calendar offered by Google Inc. of Mountain View Calif. The calendar for activity collector 204 also stores received calendar activity information in the activity database 210. The calendar activity collector 204 also sends commands and instructions to the profile server 127 to change calendar events, add calendar events, modify parties associated with events, delete events, etc.

The social network activity collector 206 is a module for interacting with one or more social network servers 101 or systems. In some embodiments, the social network activity collector 206 is coupled by network 105 for communication and interaction with the social network server 101, social network application 109 and social graph 125. The social network activity collector 206 is similar to the e-mail activity collector module 204 except that it collects activity information related to a user's interaction and use of a social network. The social network activity collector 206 interacts with a credentials module to retrieve the user's login and password as well as other information necessary to access the social network application 109 and social graph 125. The social network activity collector 206 retrieves and collects activity information about messages sent, messages received, information posted, posted information reviewed, change in status of friends, the addition of connections, removal of connections, friend requests, and any other activity that can be undertaken by the user on the social network. The social network activity collector 206 also collects information from other individuals that are important or links to the user. In one embodiment, the application interface (API) of the social network is used by the social network activity collector 206 and extracts information. Thus, those skilled in the art will recognize that the social network activity collector 206 can retrieve any information related to the user from the social network. The social network activity collector 206 stores the information it collects in the activity database 210. The social network activity collector 206 is coupled by the bus 220 to the storage 239. Example activities include friend requests, a post to a source being monitored, or any other activity on the social network of importance to the user. The social network activity collector 206 also interacts with the social network to respond to any activity such as accepting the friend request, replying to a post or any other action on the social network that is possible in response to the activity.

The other source activity collector 208 is software or routines for interacting with and extracting information from any other electronic communication system or any other activity sources 160. The other source activity collector 208 has the credentials and the application interface for interacting with the other activity sources 160. The other source activity collector 208 monitors the other sources 160 for activities of which the user wants to be notified and also can take any action with regard to the activities that is allowed by the other sources. The other source activity collector 208 collects information related to the user's interaction with those other systems. The other source activity collector 208 stores the information collected in the activity database 210. Example other sources include the third party server 107, the micro-blogging server 121, the SMS/MMS server 129, the IM server 131, the search server 135 and the web server 137.

The activity database 210 is data storage for storing information received from any of the activity sources 160. In one embodiment, the activity database 210 is a database organized by user. For each user, the activity database 210 stores any activity information received from any of the activity sources 160. For example, this can include e-mails, e-mail status, social network activity such as posts, shares, invitations, status changes etc. The activity database 210 is coupled for communication with the activity collectors 202, 204, 206 and 208. The activity database 210 is also coupled to the activity streams front end 152 to provide activity information responsive to queries from the client devices 115 and to provide the raw data used to generate the activity stream.

The encoder 164 is software or routines for encoding activity information and an activity type. In one embodiment, the encoder 164 cooperates with the other components of the activity streams backend 154 to receive activity information and an associated activity type. In one embodiment, there are multiple activity types such as an activity type for posts from a particular source (e.g., a social network), and activity type for posts from a second source (e.g., a blog), an activity type for information that has a unique set of actions (e.g., the sharing of a photo), an activity type for a particular website, etc. Thus the activity types may be defined by the source of the information; the type of information and the manner in which it should be presented; and the action or group of actions that may be taken in response to the information. The encoder 164 is coupled to the other components of the activity streams backend to receive activity information. The encoder 164 is also coupled to receive the activity type for the information either from the activity sources 160 or the activity database 210 or by analysis of the activity information. The encoder 164 encodes the activity information and the activity type into encoded information. For example, the encoder 164 serializes the activity information into an encoded message proto (general data format). In one embodiment, the encoder 164 stores the encoded information into the activity database 210 for access by the activity stream front end 152. In another embodiment, the encoder 164 also scrubs the information or anonymizes it before encoding.

Activity Streams Front End 152

The activity streams front end 152 is software or routines for processing requests that are received from the client devices 115. The activity streams front end 152 is coupled for communication with the client devices 115, in particular, the web browser 150. The activity streams front end 152 receives and processes requests from the client devices 115 for an activity stream. The activity streams front end 152 serves as a controller to process requests for activity streams, to send activity streams, to send formatting information for the activity streams, to send control signals to and from the client device 115, and to send user interaction information to the activity streams backend 154. The activity streams front end 152 is coupled to receive activity stream data from the activity streams backend 154 and generate an activity stream for the user. In one embodiment, the activity streams front end 152 includes a decoder 162. The activity streams front end 152 retrieves activity stream information in an encoded or serialized format from the activity streams backend 154. The decoder 162 decodes or de-serializes the encoded information from the activity streams backend 154 into data for the custom post and an activity type. The activity streams front end 152 is also coupled to the custom template storage 156 to retrieve and use templates and scripts or send templates and scripts to the client devices 115 as requested. The activity streams front end 152 also passes on commands to the activity streams backend 154 for transmission to and execution by the activity sources 160.

Custom Template Storage 156

The custom template storage 156 is data storage for storing information about different templates that can be used to present activity information to the user. In one embodiment, the extension system 103 has defined a number of different activity types. Each of the activity types includes a customized template for displaying information related to that activity type. In one embodiment, the customized template specifies the formatting and types of information displayed. The custom template also specifies what other actions or buttons are presented along with the activity information. For example, the actions appropriate for a comment post versus a photo being shared will be different. The custom template identifies the actions that can be taken with regard to the activity information and thereby allows customization of the rendering that is specific to the activity information. The activity type is also associated with JavaScript or a JavaScript class for use in rendering the data in the customized template. This is particularly advantageous because rather than being limited to a single method for rendering posts or being forced to create a custom rendering for each individual post, the custom template storage 156 allows the templates to be reused according to activity type which are likely to have similar characteristics. In one embodiment, the post includes additional type-specific data that can be used to decide which specific custom template to use. The custom template storage 156 is coupled for communication with the activity stream front end 152. In another embodiment, the custom template storage 156 can be accessed directly by the client device 115.

One or more of the e-mail activity collector 202, the calendar activity collector 204, the social network activity collector 206, the other source activity collector 208, the encoder 164, the activity streams backend 154, the activity streams front end 152 and the decoder 162 are executable by the processor 235. In another embodiment, one or more of the e-mail activity collector 202, the calendar activity collector 204, the social network activity collector 206, the other source activity collector 208, the encoder 164, the activity streams backend 154, the activity streams front end 152 and the decoder 162 store data that, when executed by the processor 235, causes the collectors/modules to perform the operations described below. In yet another embodiment, one or more of the e-mail activity collector 202, the calendar activity collector 204, the social network activity collector 206, the other source activity collector 208, the encoder 164, the activity streams backend 154, the activity streams front end 152 and the decoder 162 are instructions executable by the processor 235 to provide the functionality described below with reference to FIGS. 4-6. In still another embodiment, one or more of the e-mail activity collector 202, the calendar activity collector 204, the social network activity collector 206, the other source activity collector 208, the encoder 164, the activity streams backend 154, the activity streams front end 152 and the decoder 162 are stored in the memory 237 of the extension system 103 and are accessible and executable by the processor 235.

Methods

Figure 4:
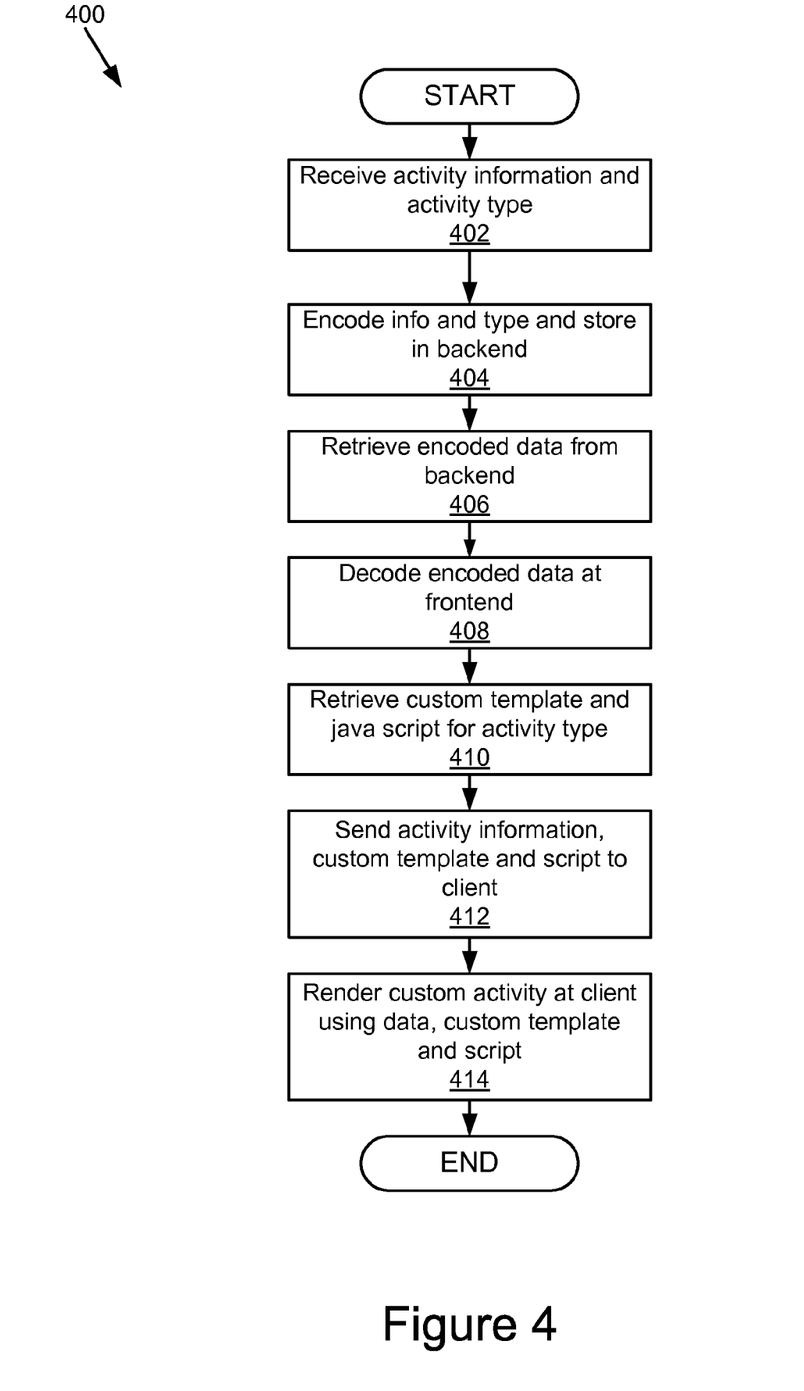
FIG. 4 is a flowchart of a method for storing and rendering custom posts in the activity stream according to one embodiment of the present disclosure.

Referring now to FIG. 4, one embodiment of a general method 400 for storing and rendering custom posts in the activity stream is described. The method 400 begins by receiving 402 activity information and activity type. In one embodiment, the activity streams backend 154 receives this information from the activity sources. In another embodiment, the activity streams backend 154 receives the activity information from the activity sources 160 and determines the activity type. Next, the method 400 continues by encoding 404 the information from step 402 and storing it at the activity streams backend 154. In an alternate embodiment, the data is immediately sent to the activity streams front end 152. Those skilled in the art will recognize that the activity streams backend 154 repeatedly performs the above process for all posts received from the activity sources. While the present invention will be described in FIGS. 4, 5 and 6 in the context of posts, it will be appreciated that the same process of typing, encoding and decoding can be applied to any type of activity information that is displayable to the user 120 on the client device 115. The method continues at the activity streams front end 152 where the encoded data is received or retrieved 406 from the activity streams backend 154. The activity streams front end 152 decodes 408 the encoded data to produce the activity information and the activity type. Based upon the activity type, the activity streams front end 152 retrieves 410 a custom template and JavaScript from the custom template storage 156. The activity streams front end 152 then sends 412 the activity information, custom template and script to the client device 115. Finally, the method completes with the client device 115 rendering a custom post using the activity information, the custom template and script.

Figure 5:
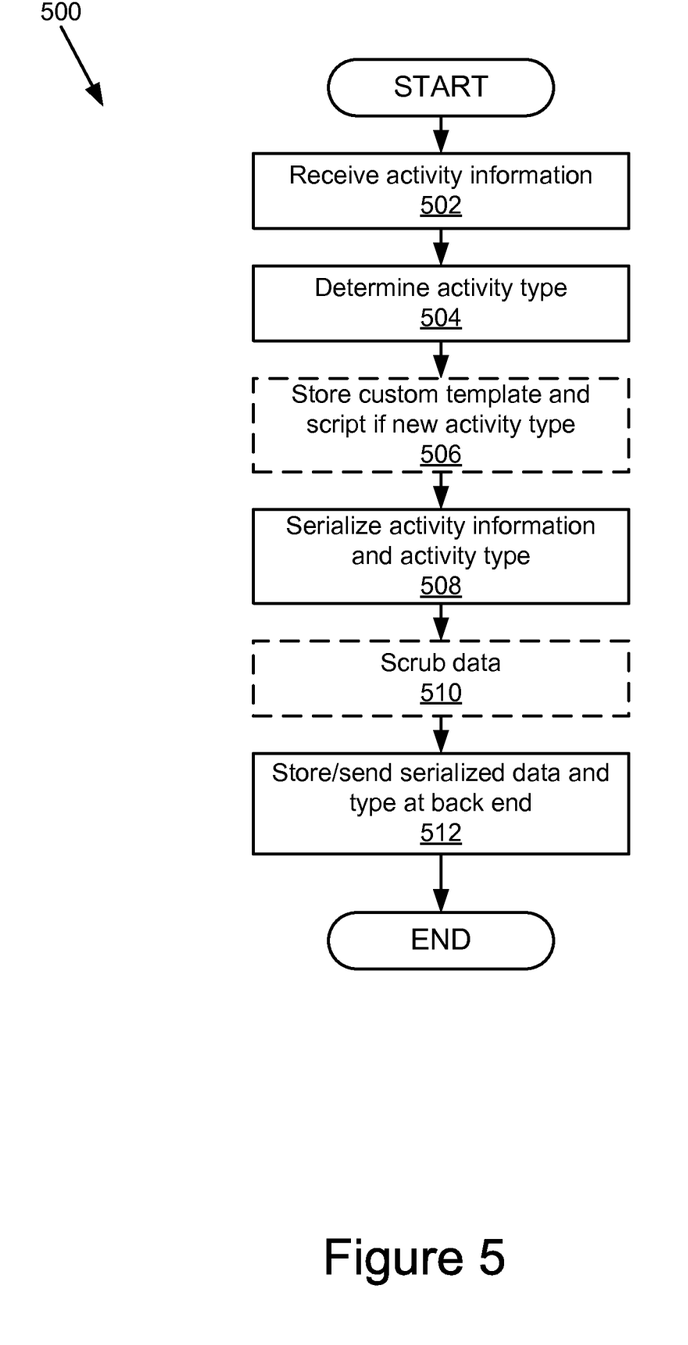
FIG. 5 is a flowchart of a method for storing activity information and an activity type in an activity streams backend according to one embodiment of the present disclosure.

Referring now to FIG. 5, one embodiment of a method 500 for storing activity information and an activity type in an activity streams backend 154 is described. The method 500 begins by receiving 502 data or activity information from one or more of the activity sources 160 at the activity streams back end 154. In one embodiment, the activity information is a custom proto or data map with associations between data and fields. In one embodiment, the same custom proto is used for all activity information. Then the method 500 determines 504 an activity type associated with the received echoed information. In one embodiment, the activity type is provided by the activity sources 160. In another embodiment, the activity streams backend 154 selects an activity type for the activity information based upon one or more of the source of the activity information, the content of the act of information, the functionality associated with the activity information, and the format for displaying the activity information. In one embodiment, there are a number of predefined activity types with associated formatting, functionality, data fields and JavaScript or JavaScript classes. Either the custom template and associated script for the activity type have already been stored in the custom template storage 156 at some time prior, or optionally, the activity streams backend 154 receives the custom template and associated script from the activity sources 160 and stores 506 it in the custom template storage 156. Then the method 500 encodes or serializes the activity information and the activity type into encoded data. In one embodiment, the data is scrubbed 510. In particular when the activity streams backend 154 stores information from a plurality of unrelated third-party sources, the data is scrubbed for security purposes. Finally, the encoded/serialized data is stored in the activity database 210 of the activity streams backend 154. In another embodiment, the encoded/serialized data is stored to a location accessible by both the activity streams backend 154 and the activity streams front end 152. In yet another embodiment, the encoder/serialized data is sent to the activity streams front end 152.

Figure 6:
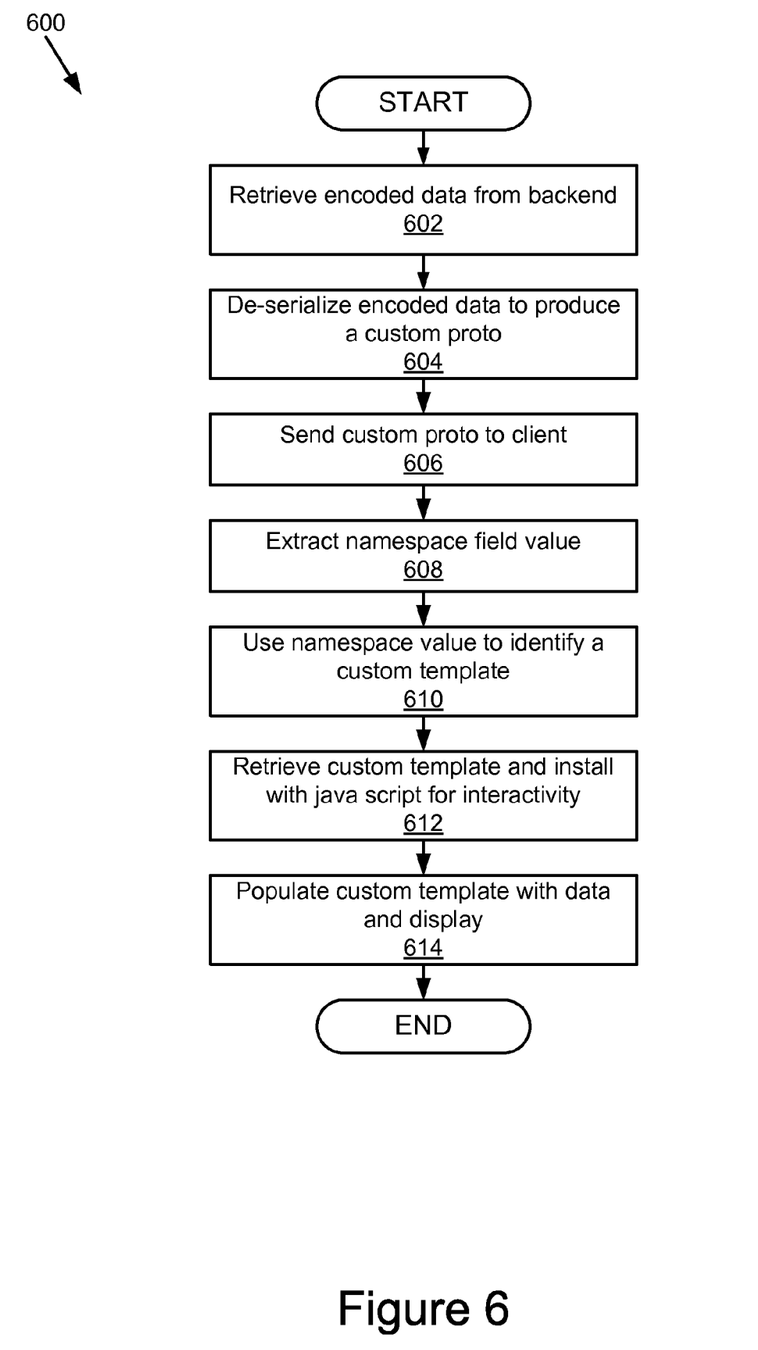
FIG. 6 is a flowchart of a method for rendering custom posts in the activity stream according to one embodiment of the present disclosure.

Referring now to FIG. 6, one embodiment of a method for rendering custom posts in the activity stream will be described. The method 600 begins retrieving 602 encoded data from the activity streams backend 154. The encoded data is de-serialized 604 to produce the activity information and an activity type. In one embodiment, the activity information and activity type is in the form of a custom proto with defined fields and corresponding data for those fields. In particular, it should be noted that one of the fields that identifies the activity type is a namespace view. Next, the method 600 send 606 the activity information and activity type to the client device 115. In one embodiment, the activity streams front end 152 does this by sending the custom proto to the client device 115. Next, either the client device 115 or the activity streams front end 152 extracts 608 the namespace field value from the custom proto. The value in the namespace field is used 610 to identify which custom template and associated JavaScript to retrieve from the custom template storage 156. Then the client device 115 or the activity streams front end 152 retrieves 612 the custom template from the custom template storage 156 and installs it with associated JavaScript for interactivity. Finally the method completes by populating 614 the custom template with data and presents it on the display of the client device 115.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for rendering custom posts in an activity stream, the method comprising:
retrieving, by a social network activity collector interacting with a credentials module on a backend server, activity information about a user's interaction with a social network;
storing the activity information in an activity database on the backend server;
encoding the activity information to produce encoded information at the backend server, wherein the encoded information identifies an activity type;
sending the encoded information to a front end server;
decoding the encoded information at the front end server to produce data and the activity type;
using the activity type to determine a custom template; and
providing the data and the activity type for rendering of the activity information based on the custom template.

2. The method of claim 1 further comprising storing the encoded information at the backend server.

3. The method of claim 1 wherein providing the data and the activity type includes sending the custom template and the associated script to a client device.

4. The method of claim 3 further comprising rendering the activity information at the client using the data, the custom template and the associated script.

5. The method of claim 1 wherein encoding includes serializing the data by the backend server.

6. The method of claim 1 further comprising scrubbing the encoded information.

7. The method of claim 1 wherein the activity information are posts in a social network.

8. The method of claim 1 wherein the activity information is a custom data map with associations between data and fields.

9. A computer program product comprising a non-transitory computer usable medium including a computer readable program, wherein the computer readable program when executed on a computer causes the computer to:
retrieve, using a social network activity collector interacting with a credentials module on a backend server, activity information about a user's interaction with a social network;
store the activity information in an activity database;
encode the activity information to produce encoded information at the backend server, wherein the encoded information identifies an activity type;
send the encoded information to a front end server;
decode the encoded information at the front end server to produce data and the activity type;
use the activity type to determine a custom template; and
provide the data and the activity type for rendering of the activity information based on the custom template.

10. The computer program product of claim 9, wherein the computer readable program when executed on the computer causes the computer to also store the encoded information at the backend server.

11. The computer program product of claim 9, wherein the computer provides the data and the activity type by sending the custom template and an associated script to a client device.

12. The computer program product of claim 9, wherein the computer encodes by serializing the data by the backend server.

13. The computer program product of claim 9, wherein the computer readable program when executed on the computer causes the computer to also scrub the encoded information.

14. The computer program product of claim 9, wherein the activity information are posts in a social network.

15. The computer program product of claim 9, wherein activity information is a custom data map with associations between data and fields.

16. A system comprising:
a processor;
a template storage for storing a plurality of templates with data used to present activity information; and
a memory coupled with the processor, the memory storing computer program code, which when executed by the processor, causes the processor to implement modules, including:
an activity streams backend for producing encoded information, the activity streams backend including a social network activity collector for interacting with a credentials module and a social network to retrieve activity information about a user's interaction with the social network, wherein the activity information is stored in an activity database on the backend, the activity streams backend configured to encode the activity information into the encoded information, wherein the encoded information identifies an activity type; and
an activity streams front end coupled to receive the encoded information from the activity streams backend, the activity streams front end configured to decode the encoded information to produce decoded information, the activity streams front end coupled to receive a template from the template storage based on the activity type, the activity streams front end configured to produce an activity stream from the decoded information and the template.

17. The system of claim 6, wherein the social network activity collector is further configured to retrieve activity information about a user's interaction with one or more from the group of a third party server, a micro-blogging server, an e-mail server, a profile server, a SMS/MMS server, an IM server, a search server and a web server.

18. The system of claim 16, wherein the template storage includes a plurality of customized templates, each of the customized templates for displaying information related to a specific activity type.

19. The system of claim 16, wherein each template includes an associated script, and a data map with associations between data and fields.

20. The system of claim 16, wherein the activity streams backend stores the encoded information.

21. The system of claim 6, wherein the activity streams backend includes an encoder coupled to receive information from the social network and encode the received information from the social network into encoded information.

22. The system of claim 6, wherein the activity streams backend includes an activity database for storing information received from the social network.

23. The system of claim 16, wherein the activity streams front end includes a decoder for decoding information received from the back activity streams backend.

* * * * *